United States Patent [19]

Pianka

[11] 3,896,219
[45] July 22, 1975

[54] S-CHLOROMETHYL DIETHYL PHOSPHOROTHIOLOTHIONATE AS A SOIL INSECTICIDE

[75] Inventor: Max Pianka, St. Albans, England

[73] Assignee: The Murphy Chemical Company Limited, St. Albans, England

[22] Filed: Sept. 28, 1973

[21] Appl. No.: 401,692

Related U.S. Application Data

[63] Continuation of Ser. No. 169,875, Aug. 6, 1971, abandoned, which is a continuation of Ser. No. 824,291, May 13, 1969, abandoned.

[30] Foreign Application Priority Data

May 25, 1968 United Kingdom............... 25279/68

[52] U.S. Cl................................ 424/225; 425/222
[51] Int. Cl............................................. A01n 9/36
[58] Field of Search............................ 424/222, 225

[56] References Cited
UNITED STATES PATENTS

| | | | |
|---|---|---|---|
| 2,928,863 | 3/1960 | Schrader | 424/225 |
| 2,931,755 | 4/1960 | Birum | 424/225 |
| 3,439,092 | 4/1969 | Fearing et al. | 424/225 |

FOREIGN PATENTS OR APPLICATIONS

| | | |
|---|---|---|
| 817,360 | 7/1959 | United Kingdom |
| 903,795 | 8/1962 | United Kingdom |
| 1,099,534 | 2/1961 | Germany |
| 105,132 | 8/1962 | Denmark |
| 1,018,314 | 1/1966 | United Kingdom |

*Primary Examiner*—Albert T. Meyers
*Assistant Examiner*—Norman A. Drezin
*Attorney, Agent, or Firm*—Bacon & Thomas

[57] ABSTRACT

A method for controlling wireworms and the larvae of rootflies in soil by applying to the soil a compound having the formula:

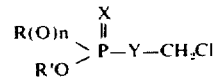

wherein R, R' are each an alkyl group having from 1 to 4 carbon atoms, one of X and Y is S and the other is O or S and $n$ is zero or one.

1 Claim, No Drawings

S-CHLOROMETHYL DIETHYL PHOSPHOROTHIOLOTHIONATE AS A SOIL INSECTICIDE

This is a continuation of application Ser. No. 169,875 filed Aug. 6, 1971, now abandoned which in turn is a continuation of application Ser. No. 824,291 filed May 13, 1969, now abandoned.

The invention relates to a method of treating soil using organo-phosphorus compounds and to compounds and compositions therefor.

A number of insects, and their larvae, are known to cause serious damage to agricultural and horticultural crops by attacking and feeding on their roots and shoots. These insects and larvae include rootflies such as the cabbage rootfly (*Hylemyia brassicae*) and wireworms (*Agriotes*, the larvae of the click beetle). Such pests may be controlled by chemical treatment with insecticides such as dieldrin or BHC (benzene hexachloride). However, these and similar soil insecticides are polyhalogenated hydrocarbons which leave extremely persistent residues in the soil, and the widespread use of these compounds is not now considered entirely desirable.

We have now found that certain organophosphorus compounds are particularly effective in the control of soil pests, e.g. those mentioned above. The compounds are particularly effective in the control of wireworms which occur in practically all economically important crops e.g. wheat, sugar beet, carrots, potato and maize.

According to the invention there is provided a method for the control of insect pests and/or their larvae which are damaging to plants which comprises applying to the soil an effective amount of a compound having the formula

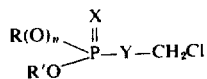

wherein R, R' are each an alkyl group having from 1 to 4 carbon atoms, preferably from 1 to 3 carbon atoms, X and Y are O or S, at least one of X and Y being S, and $n$ is zero or 1.

We are aware that compounds of the formula I in which $n = 1$, $X = O$ or S and $Y = S$ have been described in British Specification No. 817,360 as having unspecified insecticidal properties. In particular, no reference is made therein to their utility as soil insecticides, which utility was quite unexpected.

We are furthermore aware of British Specification No. 903,795, which discloses certain compounds of the formula I wherein $n = 0$, $X = O$ or S and $Y = S$. One such compound is shown to have contact insecticidal properties, but there is no reference made to the application of the compound to soil in the manner of the present invention.

The compounds having the formula I are suitably applied to the soil at a rate of from 0.56–11.2 kg/ha. However, good control of soil-living insects is often obtained at rates of from 1.12–4.49 kg/ha.

The compounds may conveniently be formulated as granules or powders containing an inert solid diluent such as fuller's earth impregnated with the toxicant of formula I; such formulations may contain from 1 to 50 percent by weight of the toxicant, or more or less, and may be applied to the soil in any suitable manner. It will be understood that a more effective insecticidal action will generally result when the formulation is physically mixed with the topsoil, such as by harrowing.

Alternatively, the compounds of formula I may be applied as a drench - that is, a solution or dispersion of the toxicant in a non-phytotoxic solvent or liquid diluent, suitably water. Such drenches may be prepared by diluting with water a concentrate containing the toxicant, an emulsifying agent, and preferably an organic solvent such as naphtha.

Accordingly, the invention further provides a composition for application to the soil for the control of insects and/or their larvae, comprising a compound of formula I and a non-phytotoxic carrier or diluent.

It has further been found that the compounds of formula I may be used in a seed dressing to control attack by insects and/or their larvae on the germinating seed. The invention, therefore, further provides dressed seed to which is adherent a composition comprising at least one compound of the formula I. The seed may be treated by agitating it in contact with a composition containing the toxicant.

The seed dressing composition suitably includes a solid carrier or diluent e.g. china clay or talc. A surface active agent may be included, with or without additional solid carrier or diluent, when the dressing is to be applied in a moistened state.

A suitable colouring agent may conveniently be included, and also, if desired, a sticking agent, the latter to increase adherence of the dressing to the seed. Solid compositions may be used in encapsulation of the seed. The seed dressing composition may also be used as a liquid in solution or dispersion form in a non-phytotoxic liquid medium e.g. water or a non-phytotoxic organic solvent, to enable the seed to be impregnated or coated with the active ingredients. Such liquids may also contain colouring agents and/or stickers as described above.

It should be noted that the

compounds of formula I are isomeric with the

compounds and may not be distinguishable therefrom. The compounds of formula I shown in Table I were prepared. Analytical results are only given for those compounds believed to be novel. The column headed "method of preparation" refers to Examples A to D following Table I, which illustrate four methods by which compounds of formula I were prepared.

Table I

| Compound No. Method of Preparation | Name of Compound Structural formula | B.P.° (mm) | $n_D^{20}$ | Found (%) (Required (%)) P   S |
|---|---|---|---|---|
| (i) O | S-Chloromethyl diethyl phosphorothiolothionate $$\begin{array}{c} OC_2H_5 \\ | \\ S=P-SCH_2Cl \\ | \\ OC_2H_5 \end{array}$$ | 113–5 (2.5) | 1.5200 | |
| (ii) A | S-Chloromethyl dimethyl phosphonothiolothionate $$\begin{array}{c} OCH_3 \\ | \\ S=P-SCH_2Cl \\ | \\ CH_3 \end{array}$$ | 61–63 (0.6) | 1.5670 | 16.2 (16.2) |
| (iii) A | s-Chloromethyl diethyl phosphonothiolothionate $$\begin{array}{c} OC_2H_5 \\ | \\ S=P-SCH_2Cl \\ | \\ C_2H_5 \end{array}$$ | 76–78 (0.6) | 1.5463 | |
| (iv) A | S-Chloromethyl O-methyl ethylphosphonothiolothionate $$\begin{array}{c} OCH_3 \\ | \\ S=P-SCH_2Cl \\ | \\ C_2H_5 \end{array}$$ | 69–71 (0.6) | 1.5605 | 14.8 (15.2) |
| (v) C | S-Chloromethyl dimethyl phosophorothiolothionate $$\begin{array}{c} OCH_3 \\ | \\ S=P-SCH_2Cl \\ | \\ OCH_3 \end{array}$$ | 99–103 (10) | 1.5268 | 32.6 (31.0) |
| (vi) C | S-Chloromethyl diethyl phosphorothiolate $$\begin{array}{c} OC_2H_5 \\ | \\ O=P-SCH_2Cl \\ | \\ OC_2H_5 \end{array}$$ | 95–98 (1.3) | 1.4752 | |
| (vii) A | S-Chloromethyl O-n-propyl methylphosphonothiolate $$\begin{array}{c} O-n-C_3H_7 \\ | \\ O=P-SCH_2Cl \\ | \\ CH_3 \end{array}$$ | 122–124 (0.9) | 1.4676 | 15.3 (15.3) |
| (viii) B | S-Chloromethyl O-n-propyl methylphosphonothiolothionate $$\begin{array}{c} O-n-C_3H_7 \\ | \\ S=P-SCH_2Cl \\ | \\ CH_3 \end{array}$$ | 76–78 (0.2) | 1.5366 | 14.5 (14.2) |
| (ix) D | S-Chloromethyl di-n-butyl phosphonothiolothionate $$\begin{array}{c} O-n-C_4H_9 \\ | \\ S=P-SCH_2Cl \\ | \\ C_4H_9 \end{array}$$ | 122 (0.5) | 1.5243 | 11.3 (11.3) |
| (x) D | S-Chloromethyl O-n-butyl s-butylphosphonothiolothionate $$\begin{array}{c} O-n-C_4H_9 \\ | \\ S=P-SCH_2Cl \\ | \\ s-C_4H_9 \end{array}$$ | 119 (0.4) | 1.5270 | 11.3 (11.3) |
| (xi) D | S-Chloromethyl di-n-propyl phosphonothiolothionate $$\begin{array}{c} O-n-C_3H_7 \\ | \\ S=P-SCH_2Cl \\ | \\ n-C_3H_7 \end{array}$$ | 146–149 (10) | 1.5305 | 13.6 (12.6) |

EXAMPLE A

S-Chloromethyl dimethylphosphonothiolothionate

Potassium O-methyl methylphosphonothiolothionate (9.0g., 0.05 mole) was heated under reflux with a solution of bromochloromethane (13.0g., 0.1 mole) in methyl ethyl ketone (30ml.) for 5-6 hr. The solid was filtered off and the filtrate was distilled to give S-chloromethyl O-methyl methyl phosphonothiolothionate (5.75g., 59.7%), b.p. 61°-63°/0.6mm., $n_D^{20}$ 1.5697 (Found: P, 16.2, $C_3H_8ClOPS_2$ requires P 16.8%).

EXAMPLE B

S-Chloromethyl propyl methylphosphonothiolothionate

Methyl thionophosphinesulphide (11g., 0.1 mole) was dissolved in n-propanol (30ml.). Then sodium carbonate (5.3g., 0.1 equiv.) was added to the resulting solution. When most of the sodium carbonate had dissolved, bromochloromethane (26 g., 0.2 mole) in methyl ethyl ketone (60ml.) was added, and the mixture heated under reflux for 7 hr. The reaction mixture was cooled, and the sodium chloride was filtered off. The filtrate was distilled to give S-chloromethyl n-propyl methylphosphonothiolothionate (10.5g., 48%) (Found: P, 14.5, $C_3H_{12}ClOPS_2$ requires P 14.2%).

EXAMPLE C

The method of Example A was modified by using acetone instead of methyl ethyl ketone.

EXAMPLE D

The method of Example B was modified by using acetone instead of methyl ethyl ketone.

Methyl, ethyl, propyl and butyl thionophosphine sulphides used in the preparation of compounds (ii), (iii), (iv), (vii), (viii) (ix) and (xi) were prepared according to the method of Newallis, Chupp and Groenweghe, J.Org.Chem. 1962, 27, 3829.

The following further compounds of formula I, numbered as xii-xvi, were prepared as described hereunder;
S-Chloromethyl O-propyl isopropylphosphonothiolothionate (compound xii)

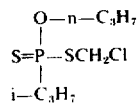

Isopropyl thionophosphine sulphide (Newallis, Chupp and Groenweghe, J.Org.Chem., 1962, 27, 3829) (4.14g., 0.03 mole) was dissolved in n-propanol (20 ml.). Sodium carbonate (1.59g., 0.03 equiv.) was then added (there was vigorous evolution of carbon dioxide). n-Propanol was removed by distillation under reduced pressure and the residual sodium O-propyl isopropylphosphonothiolothionate was dissolved in acetone (15 ml.). Subsequently the acetone solution was added, with stirring, to a solution of bromochloromethane (7.77g., 0.06 mole) in acetone (15 ml.) heated under reflux. The suspension was heated under reflux, with stirring, during 0.5 hr. The solid was filtered off, washed with acetone and the volatile components were removed from the combined filtrate and washings by heating under reduced pressure. The residual oil was dissolved in ether (50 ml.), the ether solution was then washed with water (25 ml.) and dried over sodium sulphate. The sodium sulphate was filtered off, washed with ether and the ether removed from the combined filtrate and washings by distillation under reduced pressure leaving the title compound as an oil. S-Chloromethyl O-propyl isopropylphosphonothiolothionate boiled at 87°-88°/0.3 mm., $n_D^{20}$ 1.5338 (Found : P, 12.7; $C_7H_{16}ClOPS_2$ requires P, 12.6%). It weighed 5.8g (78% yield).

S-Chloromethyl di-isopropyl phosphonothiolothionate (compound xiii)

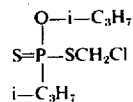

This compound was prepared from isopropyl thionophosphine sulphide, isopropanol and bromochloromethane by the same method as that used for compound xii. The product boiled at 87°-88°/0.5 mm., $n_D^{20}$ 1.5218 (Found: P, 12.8; $C_7H_{16}ClOPS_2$ requires P,12.6%). It weighed 4.9g (70% yield).

S-Chloromethyl di-s-butyl phosphonothiolothionate (compound xiv)

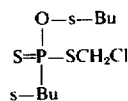

This compound was prepared from s-butyl thionophosphine sulphide, s-butyl alcohol and bromochloromethane by the method used for compound xii. S-Butyl thionophosphine sulphide was prepared by the method described by Grishina and Bezzubova, Izv.Akad.Nauk. SSSR., Ser. Khim, 1965, (9), 1619. The title compound boiled at 96°-97°/0.1 mm. $n_D^{20}$ 1.5230. (Found: P,11.1.; $C_9H_{20}ClOPS_2$ requires P, 11.3%). It weighed 2.8g (70% yield).

O-Methyl O-ethyl-S-chloromethyl phosphorothiolate (compound xv)

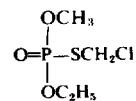

Bromochloromethane (10.4g.) potassium O-ethyl O-methyl phosphorothiolate (3.9g.) and acetone (10cc) were heated under reflux for 6 hr. The reaction mixture was filtered and the volatile components were removed from the filtrate on the steam bath. The residue was dissolved in a mixture of ether and water. The ether solution was separated, dried over anhydrous sodium sulphate and heated on the steam bath at 10 mm. The residue was the required compound $n_D^{25}$ 1.4785. (Found: P,15.5.; $C_4H_{10}ClO_3PS$ requires P, 15.2%).

S-Chloromethyl O-propyl isopropylphosphonothiolate (compound xvi)

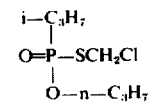

Propyl isopropylphosphonochloridothionate (Chupp and Newallis, J.Org.Chem., 1962, 27, 3832) was hydrolysed to propyl isopropylphosphonothiolic acid by the method of Hoffman, Kagan and Canfield J.Amer.Chem.Soc., 1959, 81, 148. This acid had $n_D^{20}$ 1.4805 and was prepared in an 81% yield. The acid (13g.) was dissolved in dry benzene (26 cc). To this solution was added a solution of dicyclohexylamine (14.8g.) in dry benzene (15cc). The dicyclohexylamine salt crystallised on cooling. It was filtered off, washed in benzene and dried at room temperature. It was obtained as fine white needles, m.p. 155°–156° (19.5g). The di cyclohexylamine salt (6.2g., 0.017 mole) was dissolved in hot acetone (70cc) and added dropwise to a stirred solution of bromochloromethane (8.8 g., 0.068 mole) in acetone (15 cc) at reflux with stirring. The suspension was then stirred for a further 1 hr. under reflux. The solid was filtered off, washed with acetone and the combined filtrate and washings heated under reflux for a further hr. The solid which was formed was again filtered off and washed with acetone. The volatile components were removed from the combined filtrate and washings by heating under reduced pressure. The residual oil was extracted with ether (100 cc); the ether solution was washed with water (25 cc) and dried over anhydrous sodium sulphate. The title compound was obtained as an oil, boiling at 79°–80°/0.15 mm., $n_D^{20}$ 1.4880. (Found: P, 13.7; $C_7H_{16}ClO_2PS$ requires P, 13.5%). It weighed 3 g. (75% yield).

Compounds of formula I were used, by the method according to the invention, for treating soil. The invention is illustrated in the following Examples.

EXAMPLE 1

Compounds of formula I were tested for activity against cabbage rootfly larvae (*Hylemyia brassicae*). The method of testing was as follows:

270 g of sterilized soil (John Innes No. 1) is placed in the bowl of a rotary mixer, which is then activated, and the required amount of toxicant is added slowly in 30 ml of aqueous dispersion, giving a moisture content of 10 percent. The concentration which is recorded refers to the final concentration wt/wt in the soil, and therefore the 30ml which is mixed with the soil is made up at ten times this concentration. The soil should be mixed for at least 30 seconds. After mixing, the soil is distributed into 3 plastic cups each containing a piece of peeled swede weighing about 50g, so as to cover the uppermost part of the swede; any surplus soil is discarded. The cups are then covered with petri dish halves until infestation.

On the same day in which the soil is treated, 2-3 day old eggs of *Hylemyia brassicae* which have been floated off from the egg-laying medium are taken off in batches of 25's on to small pieces of black filterpaper, using a small paint-brush. When dry, each batch of 25 eggs is used to infest one cup. The eggs are sprinkled on the surface and the soil is disturbed slightly so that the eggs do not remain exposed on the surface. The cups are then covered with polyethylene squares, and placed in the constant temperature room (75°F).

After about 10 days the cups are briefly examined and any with fungus growing over the surface are discarded (about 8 percent of the cups).

3 Weeks after treatment the cups are examined for pupae.

The total number of larvae and pupae are added together for each cup, and the percentage kill for each cup and the average percentage kill for each treatment are calculated. This is corrected for control mortality to obtain percentage control.

The results were as follows:

| Test Compound | Percentage control | | |
|---|---|---|---|
| | 10 ppm | 3 ppm | 1 ppm |
| (i) | 100 | 100 | 68 |
| (ii) | 100 | 100 | 75 |
| (iii) | 100 | 100 | 100 |
| (iv) | 100 | 100 | 91 |
| (v) | 100 | 21 | 9 |
| (vi) | 100 | 100 | 68 |
| (viii) | 100 | 100 | 69 |
| (xi) | 100 | 71 | 0 |

EXAMPLE 2

Compounds of formula I were tested for activity against wireworms (*Agriotes*, 3rd-5th instar larvae). The method of testing was as follows:

800 g of dry soil (John Innes No. 1 compost) which has been screened through a one-fourth inch sieve is placed in the bowl of a rotary mixer; this is then activated and the required amount of toxicant is added slowly as a dispersion in 200ml of water. The soil should be mixed for at least 30 seconds after emptying all the toxicant. It is then transferred to a 9 × 4 inches polystyrene dish, and the amount of soil in the dish is re-weighed (counterbalancing the dish with a similar dish). The dish is labelled with the treatment, and weight of soil it contains, and is put aside for infestation.

Eight wireworms of suitable size are placed on the soil in each dish, and allowed to burrow into the soil for 30 minutes. Any which fail to do so are removed and replaced. Sixteen wheat seeds are then planted in two rows of eight, and the dishes are transferred to a constant-temperature cabinet at 15°C.

Three times per week (Mondays, Wednesdays and Fridays) the dishes are watered to their original weight. Once per week, any dead wireworms on the surface are removed and recorded.

Assessment is carried out 4 weeks after treatment. First the number of plants which have grown is counted; the number of these which have been damaged by wireworm is also recorded. The plants are removed, and the soil is tipped on to a shallow tray and is carefully sifted through for dead and living wireworms (this is made easier if the soil is dry, and so the last watering of the soil is best carried out at least three (but not more than five) days before assessment). Any missing wireworms are assumed to have died and disintegrated.

The percentage kill of each treatment is calculated, and this is corrected for any natural mortality.

The percentage of surviving plants and the percentage of those which are damaged are also recorded.

The results of the tests were as follows:

| Test Compound | Percentage control 5 ppm ( = 2.24 kg/ha) |
|---|---|
| (i) | 91, 100, 100 (3 tests) |
| (ii) | 100 |
| (iii) | 96 |
| (iv) | 96 |
| (v) | 100 |
| (vi) | 100 |
| (viii) | 100 |
| (xi) | 95 |

EXAMPLE 3

Example 2 was repeated with the difference that the toxicant was applied six weeks before infestation with wireworms. The results were as follows:

| Test Compound | Percentage control 5ppm ( = 2.24 kg/ha) |
| --- | --- |
| (i) | 86, 100 (2 tests) |
| (ii) | 96 |
| (iii) | 96 |
| (iv) | 100 |
| (v) | 69 |
| (viii) | 95 |

EXAMPLE 4

Compound (i) was tested under garden conditions for effectiveness against cabbage rootfly (*Hylemyia brassicae*). The compound was used as a drench.

25g. of the toxicant was mixed with 8g. of a mixture of anionic and non-ionic emulsifiers and made up to 100ml. With heavy naphtha. The concentrate was then diluted with water to the required concentration.

The 25 percent emulsifiable concentrate of (i) was diluted with water to give a concentration of 500 p.p.m. A quantity of 70ml. of this dilution was applied on the soil round the base of cabbage plants on the 30th June. The assessment of control of the cabbage root flies was carried out on the 26th July, by lifting the fifty-four plants and examining the roots by cutting them longitudinally and counting the larvae.

The following results were obtained:
Compound (i) at 500 p.p.m. gave 0.10 larvae per root
Untreated gave 2.13 larvae per root
Thus a very high control of the infestation was obtained with compound (i).

EXAMPLE 5

Example 4 was repeated, except that the compound (i) was applied to the soil in the form of granules containing 5 wt percent of the toxicant:

5 g. of the toxicant was dissolved in 8 g. of diacetone alcohol. The solution was mixed with 87g. of granules made of fuller's earth, measuring between 0.35 and 0.7mm.

The granules were placed on the surface of the soil round each cabbage plant so as to give a concentration of 0.05g. of compound (i) per plant (1g. of granules). The treatment took place on the 8th June. The cabbage plants were lifted on the 31st August. The roots of the plants were then cut longitudinally and inspected for damage caused by the root fly.

Compound (i) at 0.05 g. per plant gave 25% damaged roots
Untreated gave 82% damaged roots
The yield of the cabbage plants was assessed. There was a significant increase in the yield of plants treated with compound (i).

EXAMPLE 6

The procedure of Examples 4 and 5 was repeated, using compounds (i), (ii), (iv) and (viii) as both drenches (as Example 4) and granules (as Example 5).

The following results were obtained:

| Compound | Formulation | Mean % Survival of plants | Mean weight of plants/replicate | Mean % of plants infested |
| --- | --- | --- | --- | --- |
| (i) | drench | 100 | 203 | 0 |
|  | granules | 100 | 292 | 0 |
| (ii) | drench | 100 | 232 | 7.3 |
|  | granules | 87 | 260 | 6.7 |
| (iv) | drench | 98 | 187 | 0 |
|  | granules | 96 | 315 | 2.3 |
| (viii) | drench | 98 | 192 | 0 |
|  | granules | 94 | 302 | 0 |
| Control | — | 96 | 243 | 34.0 |

EXAMPLE 7

Example 6 was repeated with the difference that cauliflowers were used as the indicator plant. Assessment was made on the larvae of the second generation of flies. The results were as follows:

| Compound | Formulation | Mean % Survival of plants | Mean weight of plants/replicate | Mean % of plants infested |
| --- | --- | --- | --- | --- |
| (i) | drench | 100 | 1150 | 0 |
|  | granules | 98 | 958 | 0 |
| (ii) | drench | 94 | 867 | 53.5 |
|  | granules | 98 | 875 | 43.5 |
| (iv) | drench | 98 | 925 | 0 |
|  | granules | 94 | 892 | 0 |
| (viii) | drench | 96 | 892 | 29.8 |
|  | granules | 94 | 1025 | 4.7 |
| Control | — | 94 | 842 | 81.3 |

EXAMPLE 8

Compound (i) was tested for activity against wireworms under garden conditions.

5 percent Granules of compound (i) prepared as in Example 5 were spread on soil and the soil was harrowed in order to bury the granules to a depth of about 3 inches. Spring barley or wheat was then drilled and allowed to germinate (6–8 weeks).

The plants were inspected at random for damage; the damaged plants had yellowed and withered centre shoots. In addition the total number of plants in 3.05 m of row was recorded. This included healthy and damaged plants. Two tests were carried out, (I) using barley and (II) using wheat:

(I) Compound (i) at 2.24 kg/ha; 142 plants per 3.05 m row; 1.2% damaged plants; 954 ears per 7.3m row Untreated 108 plants per 3.05m row; 16.3% damaged plants; 602 ears per 7.3m row (II) Compound (i) at 2.27 kg/ha; 207 plants per 3.05m row; 0.6% damaged plants Untreated 181 plants per 3.05m row; 3.7% damaged plants There was a higher percentage of damaged plants in the untreated plants that in those treated with compound (i). Therefore, in addition to a higher number of plants that were present per 3.05m. of row the crop had a vastly greater number of healthy plants in the case of compound (i).

EXAMPLE 9

Compound (i) was assessed for control of wireworms in sugar beet. The toxicant was made up as a 25 percent emulsifiable concentrate and diluted with water to give a concentration of 500 p.p.m. The diluted mixture was applied to the soil at the rate of 4.49 kg of toxicant per hectare.

The treated crop yielded 381 emerged plants, while the untreated control crop yielded 317 emerged plants.

EXAMPLE 10

Dressed seed according to the invention was prepared as follows. A toxicant of formula I (40 g.) was adsorbed onto a highly adsorbent calcium silicate (15 g.) and intimately mixed with china clay (45 g.). The resulting mixture was then applied to seed using a conventional seed dressing apparatus.

I claim:

1. A method for the control of wireworms and the larvae of rootflies in soil by applying to the soil containing said pests or larvae from 1.12 to 4.49 kg/ha of s-chloromethyl diethylphosphorothiolothionate.

* * * * *